United States Patent [19]

Kobayashi et al.

[11] Patent Number: 5,223,350
[45] Date of Patent: Jun. 29, 1993

[54] MOLD MATERIAL FOR MOLDING OF AN OPTICAL PART AND PROCESS FOR PRODUCING THE SAME

[75] Inventors: Masaki Kobayashi; Tomoyuki Oshita; Hiroshi Kijima, all of Kawasaki, Japan

[73] Assignee: Toshiba Tungaloy Co., Ltd., Kawasaki, Japan

[21] Appl. No.: 474,776

[22] PCT Filed: Jul. 14, 1989

[86] PCT No.: PCT/JP89/00709
§ 371 Date: Mar. 15, 1990
§ 102(e) Date: Mar. 15, 1990

[87] PCT Pub. No.: WO90/00528
PCT Pub. Date: Jan. 25, 1990

[30] Foreign Application Priority Data

Jul. 15, 1988 [JP] Japan .................. 63-176535
Jun. 9, 1989 [JP] Japan .................. 1-148160
Jun. 13, 1989 [JP] Japan .................. 1-141387

[51] Int. Cl.⁵ .......................................... B32B 18/00
[52] U.S. Cl. ............................. 428/697; 428/698; 428/699; 428/701; 428/702; 106/38.9
[58] Field of Search ................... 264/2.5, 60, 65; 106/38.27; 420/428; 501/132, 87, 88, 96, 97; 428/212, 697, 698, 699, 701, 702, 472

[56] References Cited

U.S. PATENT DOCUMENTS

| | | | |
|---|---|---|---|
| 2,217,802 | 10/1940 | Koehring | 106/38.27 |
| 2,498,622 | 2/1950 | Mochel | 501/132 |
| 3,711,171 | 1/1973 | Orkin et al. | 308/241 |
| 3,773,531 | 11/1973 | Manigault | 501/132 |
| 4,252,758 | 2/1981 | Yamaguchi | 264/60 |
| 4,374,897 | 2/1983 | Yamaguchi | 428/446 |
| 4,717,535 | 1/1988 | Adlerborn et al. | 264/65 |
| 4,810,676 | 3/1989 | Watanabe et al. | 501/87 |
| 4,889,548 | 12/1989 | Kriegesmann et al. | 106/38.9 |

FOREIGN PATENT DOCUMENTS 1-172542 10/1989 Japan .

Primary Examiner—Mark L. Bell
Assistant Examiner—Margaret Einsmann
Attorney, Agent, or Firm—Foley & Lardner

[57] ABSTRACT

There are disclosed a mold material for molding of an optical part, composed of at least the molding surface of a mold for molding, which comprises a sintered body or a coated layer composed mainly of at least one chromium compound selected from chromium oxide, chromium oxycarbide, chromium oxynitride and chromium oxycarbonitride and a process for producing the same.

When an optical part is molded by use of the mold of the present invention, the optical part after molding can be easily taken out from the mold, and the mold has a long lifetime, and also the optical part obtained has excellent surface precision.

24 Claims, No Drawings

MOLD MATERIAL FOR MOLDING OF AN OPTICAL PART AND PROCESS FOR PRODUCING THE SAME

TECHNICAL FIELD

This invention relates to a mold material for molding of an optical part and a process for producing the same, more particularly to a mold material for molding of an optical part and a process for producing the same, which are suitable for molding primarily lens, prism, compact disc or optical magnetic disc, to be used as a part for optical instruments as represented by optical measuring instruments such as camera, microscope and telescope, picture instruments such as video camera, video movie and video disc, acoustic instruments, office instruments such as facsimile, laser beam printer and copying machine.

BACKGROUND ART

In the prior art, as the mold for molding an optical part with a desired shape by heating and softening a glass or a plastic, followed by pressurization, a dice steel, a stainless steel or a hard alloy, has been used. However, these mold materials have the problem that they are short in life because of mold releasability between the mold and the material to be worked softened by heating, particularly in the case of a glass softened at a high temperature or the surface precision of the optical part after molding. A large number of mold materials for molding of an optical part for solving this problem have been proposed, and representative of them are Japanese Provisional Patent Publication No. 266321/1986, Japanese Provisional Patent Publication No. 50334/1988 and Japanese PCT Provisional Patent Publication No. 503058/1988.

Japanese Provisional Patent Publication No. 266321/1986 discloses a mold for glass molding comprising a mold itself constituted of electroconductive ceramics, having a mirror working applied on its molding surface, with the mold itself being heat generated through current passage, or a mold for glass molding comprising a coating comprising carbide or nitride of Si covered on the above molding surface. The mold for glass molding of the Publication is constituted of electroconductive ceramics and its mold itself is heat generated by current passage, whereby it has the advantage that the heated temperature on the molding surface of the mold is uniformized. Also, when a film comprising carbide or nitride is covered on the molding surface, as compared with a mold comprising a steel or a hard alloy of the prior art, an excellent feature can be obtained that the material to be worked softened by heating can become readily released from the mold. However, particularly when the material to be worked comprises a glass, it is required to be worked at a high temperature, and during such high temperature molding, the molding surface of the mold will react with the glass, whereby there are involved such problems that the surface of the glass after molding is susceptible to coarsening, particularly that it is difficult to obtain a molded article having equal surface precision to that of the molding surface of the mirror polished mold material, that the molded glass is liable to be colored, and that the glass after molding can be released from the mold with difficulty.

Japanese Provisional Patent Publication No. 50334/1988 discloses a mold for molding of an optical glass element comprising a metal nitride layer such as NbN, ZrN or AlN formed on a hard alloy.

The mold for molding of an optical glass element in the Japanese Provisional Patent Publication No. 50334/1988 is less in reactivity with the glass softened by heating as compared with the mold for molding comprising a steel or a hard alloy of the prior art, because the hard alloy does not directly contact with the glass, and excellent in mold releasability. However, there are involved such problems that the molded glass is liable to be colored, particularly that it is difficult to mirror polish the molding surface of the mold material and mold a glass to a glass surface having the surface precision of such mirror polishing, and that mold releasability is not still satisfactory because the reaction occurs between a glass and a nitride.

Japanese PCT Provisional Patent Publication No. 503058/-1988 discloses a method for using an $Al_2O_3$ ceramics material, a ceramics material containing $ZrO_2$ and/or $HfO_2$ and a ceramics material comprising a mother material of tetragonal $ZrO_2$ and $Al_2O_3$, and/or $Cr_2O_3$ as a press tool for molding a constituent material comprising a glass or a ceramics material containing a glass. In the same Publication, there is disclosed a method for using an oxide ceramics as a press tool for molding of a glass. However, this uses an oxide ceramics material such as $Al_2O_3$ ceramics, $ZrO_2$ and/or $HfO_2$ ceramics, which is a material for tool of the prior art as the mold for molding of a glass. Accordingly, no investigation has been done about mold releasability between the glass and the mold for molding or the influence of the mold for molding on the glass, such as the reaction degree between the compositional components of the mold for molding and the glass or the molding surface precision of the glass. Also, all the oxide ceramics cannot be used for the tool for molding of a glass, but, for example, when a glass is molded by use of a mold of $Al_2O_3$ ceramics or $ZrO_2$ ceramics of the prior art, there are problems that the mold and the glass will be readily adhered, and that the surface precision of the glass molding surface after molding is inferior.

DISCLOSURE OF THE INVENTION

An object of the present invention is to provide a mold material for molding of an optical part which cancels the above problems, excellent in lubricating property to an optical part such as of a glass, excellent in surface precision and mold releasability of an optical part such as a glass, during molding, and a process for producing the same.

The present inventors have investigated about the mold for glass molding from the standpoints of wettability, foaming, corrosion and coloration to a glass used in various uses as optical elements, particularly a glass under molten state, and obtained a knowledge that a material containing chromium and oxygen is excellent for the mold material for glass molding. The present inventors have further investigated with addition of strength in practical in addition to the standpoints as mentioned above, and consequently obtained a knowledge that by controlling a composition comprising a combination of a chromium compound with at least one oxide and the ratio of the components, the composition becomes readily sinterable to give a sintered body of stable quality which is dense, high in strength and also excellent in surface precision, and when an optical part such as of a glass, is molded by use of the sintered body, the optical part after molding becomes excellent in foaming resistance, mold releasability and smoothness, to accomplish the present invention. Further, the present inventors have investigated in the direction of enhancing the strength of the mold, and consequently obtained a knowledge that a further excellent mold material for molding of an optical part can be obtained by making at least the molding surface of the base material which is in contact with the material to be worked a layer of a chromium compound with low affinity with the optical part such as of a glass, and forming a composite mold with a layer thickness of the chromium compound of 0.1 to 5 mm, when considering a combination of the layer of the chromium compound and the material of the substrate, particularly strength, to accomplish the present invention.

More specifically, the mold material for molding of an optical part of the present invention is characterized in that at least the molding surface of the mold for molding comprises a sintered body or a coated layer composed mainly of at least one chromium compound selected from chromium oxide, chromium oxycarbide, chromium oxynitride and chromium oxycarbonitride.

Also, the mold material for molding of an optical part of the present invention comprises a sintered body comprising 2 to 50 vol % of at least one first substance selected from oxides of Zr, Hf, Si and rare earth metals and mutual solid solutions of these, with the balance comprising at least one chromium compound selected from oxides, oxycarbides, oxynitrides and oxycarbonitrides of Cr and inevitable impurities.

Further, the mold material for molding of an optical part of the present invention is a composite mold having a coated layer formed on the surface of a base material, with at least the molding surface of said composite mold at which a material to be worked is molded comprising a coated layer with a thickness of 0.1 to 5 mm, said coated layer being composed mainly of at least one chromium compound selected from chromium oxide, chromium oxycarbide, chromium oxynitride and chromium oxycarbonitride.

Also, the process for producing the mold material for an optical part of the present invention comprises sintering a powdery mixture composed of at least one first starting substance selected from oxides of Zr, Hf, Si and rare earth metals and mutual solid solutions of these and at least one chromium compound selected from oxides, carbides and nitrides of Cr and mutual solid solutions of these (chromium-containing starting substance) in vacuum, nitrogen gas or an inert gas under the conditions of a pressure of 50 kg/cm$^2$ or higher and a temperature of 1100° C. or higher, and subsequently subjecting to hot isostatic press (HIP) treatment under the conditions of a pressure of 1000 kg/cm$^2$ or higher and a temperature of 1100° C. or higher.

Further, the process for producing a mold material for molding of an optical part of the present invention comprises applying a coating substance composed mainly of at least one selected from chromium oxide powder, chromium oxycarbide powder, chromium oxynitride powder and chromium oxycarbonitride powder, and precursors which become chromium oxide, chromium oxycarbide, chromium oxynitride and chromium oxycarbonitride after temperature elevation on at least the molding surface of a base material at which a material to be worked is molded, or adjoining pressed powder composed of said coating substance thereto, then embedding the coated substance or adjoining product in boron nitride powder and forming it into a composite product in vacuum, nitrogen gas or an inert gas under the conditions of a pressure of 50 kg/cm$^2$ or higher and a temperature of 1100° C. or higher to form a composite product, or further subjecting said composite product to HIP treatment under the conditions of a pressure of 1000 kg/m$^2$ or higher and a temperature of 1100° C. or higher, thereby obtaining a composite mold with at least said molding surface composed of a coated layer with a thickness of 0.1 to 5 mm, said coated layer being composed mainly of at least one chromium compound selected from chromium oxide, chromium oxycarbide, chromium oxynitride and chromium oxycarbonitride.

BEST MODES FOR PRACTICING THE INVENTION

The mold material for molding of an optical part of the present invention may be a composite type comprising a mold for molding having a base material of, for example, a steel or a hard alloy or a sintered alloy such as cermet, or a ceramic sintered body of which at least one surface is constituted of a sintered body of a chromium compound, or the whole of the mold for molding may be constituted of a sintered body of a chromium compound. Among them, when a composite type is to be formed, the molding surface of the mold for molding, for example, the molding surface portion molded to a thickness of 0.1 to 5 mm is prepared with a sintered body of a chromium compound and the outer peripheral portion and the lower surface portion of the mold for molding are prepared with a base material such as a steel, a steel alloy, a sintered alloy, a ceramic or carbon. Subsequently, the molding surface portion and the base material are formed into a composite type according to the brazing method or the metallizing method practiced in the prior art. The molding surface as herein mentioned is the mold material surface at which the optical part directly contacts with the mold material during press molding of an optical part when forming an optical part into a desired shape. In the case of a mold for molding of the composite type comprising the molding surface portion and the base material, the effect of the molding surface portion for the optical part and the strength of the base material are combined to give preferably a long life.

In the sintered body of the chromium compound in the mold material for molding of an optical part of the present invention, when the chromium compound is substituted with 50 vol % or less of at least one compound selected from oxides, carbides, nitrides and borides of metals of the groups 4a, 5a and 6a of the periodic table (Ti, Zr, Hf, V, Nb, Ta, Cr, Mo, W), oxides, nitrides and carbides of Si and B, oxides and nitrides of Al, oxides of alkaline earth metals (Be, Mg, Ca, Sr, Ba), oxides of rare earth metals (Sc, Y, La, Ce, Pr, Nd, Sm, Eu, Gd, Tb, Dy, Ho, Er, Tm, Yb, Lu) and mutual solid solutions of these, a dense sintered body and a sintered body of high strength and high hardness can be preferably obtained. This compound may exist in some cases as the mutual solid solution with the chromium compound or in some cases at the grain boundary of the chromium compound depending on the kind of the compound. Also, when the chromium compound is substituted with 50 vol % or less of at least one metal or alloy selected from Nb, Ta, Cr, W, Ru, Rh, Pd, Re, Ir, Pt and Au, thermal shock resistance becomes preferably excellent.

The sintered body in the mold material for molding of an optical part of the present invention has the effect for the material for optical part such as molten glass, if it contains at least 50 vol % of a chromium compound, and from the standpoints of the effect for the material for an optical part and the characteristics of the sintered body, it is particularly preferred that 80 to 90 vol % of a chromium compound is contained.

For the sintered body of the chromium compound, the mold for molding constituted of a coated film composed mainly of a chromium compound has the same effect as described above.

More specifically, the mold material for molding of an optical part of the present invention, as described above is characterized in that at least the molding surface of the base material for molding comprises a coated film with a thickness of 0.1 un to 0.1 mm composed mainly of at least one chromium compound selected from chromium oxide, chromium oxycarbide, chromium oxynitride and chromium oxycarbonitride.

The coated film in the mold material for molding of an optical part of the present invention may be a film formed by the chemical vapor deposition method (CVD method), the physical vapor deposition method (PVD method) or the flame spray coating method which had been practiced in the prior art, or may also comprise an oxide film formed by, for example, the oxidation treatment.

As the base material for the mold for molding to be used in the present invention, there can be included steel, a hard alloy, a sintered alloy, a ceramics sintered body or carbon.

Particularly, the case when the base material is a hard alloy and the coated film formed on the surface of this base material comprises a chromium compound is preferred for adhesiveness of the base material with the coated film, strength of the base material and the effect of the coated film for the material for an optical part. Also, the case when the base material comprises a steel and the coated film formed on the surface of the base material is a flame spray coated film comprising at least 50 vol % of a chromium compound is particularly preferred for the same reason as mentioned above.

The above mold material for molding of an optical part of the present invention can be prepared by the method of powder metallurgy of the prior art or by application of the method for forming a coated film of the prior art.

The mold material for molding of an optical part in the present invention may preferably have the composition as described above. As such composition, for example, $ZrO_2$, $HfO_2$, $SiO_2$, $Sc_2O_3$, $Y_2O_3$, $La_2O_3$, $Ce_2O_3$, $Nd_2O_3$, $Sm_2O_3$, $Dy_2O_3$, $Yb_2O_3$, $(Zr,Hf)O_2$, $(Zr,Y)O_2$ and $ZrSiO_4$, can be mentioned. If the amount of the first substance is less than 2 vol % based on the whole sintered body, the effect of inhibiting grain growth of the chromium compound which is the main component is markedly lowered to result in a sintered body of coarse grains, whereby the strength of the sintered body is lowered and the surface precision of the optical part after molding is lowered. On the contrary, if the amount of the first substance exceeds 50 vol % base on the whole sintered body, the amount of the chromium compound is relatively reduced, and consequently, the mold will react more easily with a material to be worked during molding. For this reason, the amount of the first substance in the sintered body is determined as 2 to 50 vol %. The first substance is particularly preferably made 5 to 30 vol % of the whole sintered body, because mechanical characteristics such as strength and hardness of the sintered body are excellent, and the surface precision of the optical part after molding becomes markedly excellent. In the present invention, it is preferred to substitute 80 vol % or less of the first substance with at least one second substance selected from oxides of Al, Ti, V, Nb and Ta and mutual solid solutions of these, because formation of a solid solution of the second substance and the chromium compound is promoted, and also sintering is promoted to enable low temperature sintering without deposition of metallic chromium mentioned below.

As the second substance, for example, $Al_2O_3$, $TiO$, $TiO_2$, $V_2O_5$, $Nb_2O_5$, $Ta_2O_5$, $Al_2TiO_5$, $(Ti_3,V)O$ and $VTa_9O_{25}$, can be mentioned.

As the chromium compound in the mold material for molding of an optical part of the present invention, for example, $Cr_2O_3$, $CrO_3$, chromium oxycarbide, chromium oxynitride and chromium oxycarbonitride can be mentioned. This chromium compound and the first substance and the second substance as described above may also comprise stoichiometric composition or non-stoichiometric composition, and particularly the chromium compound may sometimes form a solid solution with the first substance or the second substance by decomposition or reaction during sintering. At this time, from the chromium compound, metallic chromium or metallic chromium containing inevitable impurities such as Fe contained in the starting substance may be sometimes crystallized out. When metallic chromium is crystallized out into the sintered body, there are shortcomings as follows: that part will be preferentially abraded during molding of the mold to form a concavity, and that part will be susceptible to plastic deformation, whereby unevenness is liable to be formed on the working surface of the mold in contact with the material to be worked. For this reason, it is preferred to inhibit crystallization of metallic chromium into the sintered body, but on the contrary, by crystallizing out metallic chromium, there is the advantage that the product becomes readily sinterable to give a dense and high strength sintered body. Particularly, when 0.1 vol % or less of the chromium compound is substituted with metallic chromium, the advantage rather than the shortcomings as described above can be preferably extracted.

The mold material for molding of an optical part of the present invention comprising these constituent requirements should be preferably made to have a surface roughness of at least one surface of the sintered body for forming the mold, specifically the molding surface of the sintered body which contacts with the material to be worked during molding, of 0.02 μm or less in terms of $R_{max}$, because the surface smoothness of the optical part after molding becomes excellent state and, after molding, the product can be practically applied as such for an optical part. The surface roughness written here is a value measured as based on JIS B0601.

The mold material for molding of an optical part of the present invention can be prepared according to various methods, but it is preferably prepared according to the following method for effecting sintering easily, and obtaining easily a dense sintered body.

More specifically, the process for producing the mold for molding of an optical part, as described above, comprises sintering a powdery mixture composed of at least one first starting substance selected from oxides of Zr, Hf, Si and rare earth metals and mutual solid solutions of these and at least one chromium compound selected from oxides, carbides and nitrides of Cr and mutual solid solutions of these in vacuum, nitrogen gas or an inert gas under the conditions of a pressure of 50 kg/cm² or higher and a temperature of 1100° C. or higher, and then subjecting the sintered body to HIP treatment under the conditions of a pressure of 1000 kg/cm² or higher and a temperature of 1100° C. or higher. Also, in the present invention, it is preferred to substitute 80 vol % or less of the first starting substance with a second substance comprising at least one powder selected from oxides of Al, Ti, V, Nb and Ta and mutual solid solutions of these.

As the first starting substance, the second starting substance and the chromium compound in the production process of the present invention, it is preferred to use high purity and uniformly fine powder, for example, powder of 2 μm or less. Among them, the first substance can use the powder which constitutes the first substance as described above, and the second starting substance the powder which constituted the second substance as described above. As the chromium compound, for example, powder of $Cr_2O_3$, $CrO_3$, $Cr_3C_2$, CrN, Cr(O,C), Cr(O,N) and Cr(O,C,N) can be used. After these first and second starting substances and the chromium compound are formulated in predetermined amounts, it is preferred to use a mixing method which can inhibit entrainment of impurities as far as possible, for example, the method of obtaining mixed powder in a mixing vessel lined with a rubber. The mold of the present invention can be obtained according to the method in which such mixed powder or mixed powder formed into a molded product by the molding method in powder metallurgy of the prior art is packed in a carbon mold coated with a mold release agent (e.g. BN powder), or the method in which it is filled in a mold release agent and hot press sintered in vacuum or an inert gas atmosphere at a temperature of 1200° C. or higher, preferably 1250° to 1400° C., under a pressure of 50 kg/cm² or higher, preferably 200 to 500 kg/cm², or the method in which after sintering, the sintered body is subjected to the HIP treatment under the conditions of a temperature not higher than the sintering temperature under a pressure of 1000 kg/cm² or higher. The HIP treatment can be also practiced in an inert gas or nitrogen gas atmosphere, but particularly preferably in an atmosphere in which minute amount of oxygen gas is added because precipitation of metallic chromium phase into the sintered body can be prevented.

In the present invention, it is further preferred that the mold material for molding of an optical part is a composite material comprising the constitution as described below.

The coated layer in the mold material for molding of an optical part of the present invention, when it comprises only at least one chromium compound selected from chromium oxide, chromium oxycarbide, chromium oxynitride and chromium oxycarbonitride and inevitable impurities, or when it comprises at least 50 vol % of the chromium compound and otherwise, for example, at least one selected from oxides, carbides, nitrides of rare earth metals, metals of the groups 4a, 5a and 6a of the periodic table, Al and Si, and solid solutions of these, can preferably maintain low affinity with a glass or plastic which is the material to be worked. Particularly preferably, in the case of a coated layer containing 50 vol % or less of at least of the oxide phase selected from oxides of Ti, Zr, Hf, Al, Si, Y, La, Ce, Nb, Sm, Dy and Yb and mutual solid solutions of these, with the balance comprising the chromium compound and inevitable impurities, for example, since the product becomes readily sinterable when forming the coated layer by sintering, the chromium compound grains become finer, and various characteristics of the coated layer itself such as strength, heat resistance, thermal shock resistance and surface precision are improved. Further, when an oxide type ceramics such as an $Al_2O_3$ type ceramics composed mainly of $Al_2O_3$, a $ZrO_2$ type ceramics composed mainly of $ZrO_2$, or a $Cr_2O_3$ type ceramics composed mainly of $Cr_2O_3$ is used as the base material, the base material and the coated layer react with each other to be bonded together, whereby a composite mold with high strength can be formed particularly preferably. Also, when the chromium compound in the coated layer is substituted with 0.1 vol % or less of metallic chromium, the strength of the coated layer will be preferably improved. If the thickness of the coated layer is less than 0.1 mm, it becomes difficult to use after repolishing and therefore the cost becomes higher. On the other hand, if it exceeds 5 mm, it becomes difficult to form a dense coated layer of fine uniform grains, and also chipping is liable to occur in the coated layer during molding of the mold. For the above reasons, the thickness of the coated layer is determined as 0.1 to 5 mm.

As the base material in the mold material for molding of an optical part of the present invention, any material which can stand thermal shock and deformation by temperature, pressure, repetition of heating and cooling during molding of an optical part, and can include, for example, $Al_2O_3$ type ceramics, $ZrO_2$ type ceramics, $Cr_2O_3$ type ceramics, SiC type ceramics, $Si_3N_4$ type ceramics, sialon type ceramics, TiC cermet, TiC-TiN type cermet, $Cr_3C_2$ type cermet, $Al_2O_3$ type cermet, WC-Co type hard alloy, WC-TiC-Ni type hard alloy, refractory metals such as Cr, Mo, W, Ta, Nb, platinum group metals and alloys composed mainly of these, heat-resistant steel, super-alloys such as Inconel and Waspalloy. Among them, $Al_2O_3$ type ceramics or $Cr_2O_3$ type ceramics is particularly preferred, because in addition to excellent various characteristics such as heat resistance oxidation resistance and strength, bonding through mutual diffusion with the coated layer becomes possible and also the coefficients of thermal expansion are approximate, whereby peeling due to the difference in thermal expansion between the coated layer and the base material will occur with difficulty, to give also excellent adhesiveness.

When the thermal expansion difference from the base material is great, or in the case of a combination having a problem in adhesiveness, it is also preferred to form a composite mold comprising an intermediate layer having a coefficient of thermal expansion between the coefficient of thermal expansion of the base material and the coefficient of thermal expansion of the coated layer interposed between the base material and the coated layer. Examples of such intermediate layer may include $Al_2O_3$, $TiO_2$, $SiO_2$, carbides, nitrides, carboxides and nitroxides of metals of the groups 4a, 5a and 6a of the periodic table and mutual solid solutions of these, iron group metals and metals of the group 6a of the periodic table. The intermediate layer differs primarily depending on the material of the base material. For example, when the base material is a metallic type material with great coefficient of thermal expansion such as heat-resistant steel or super-alloy, an intermediate layer such as $Cr_3C_2$-Ni type cermet or TiC-Cr type cermet is preferred, while in the case of a $Si_3N_4$ type ceramics or SiC type ceramics with small coefficient of thermal expansion, an intermediate layer of $Cr_2O_3$-$SiO_2$ type ceramics is preferred. Also, the intermediate layer may be a single layer, or alternatively of the structure of multiple layers in which the intermediate layer on the side contacted with the base material is made a material with a coefficient of thermal expansion nearer to the base material, and the intermediate layer contacted with the coated layer is made a material with a coefficient of thermal expansion nearer to the coated layer. Further, it is also preferred to provide an intermediate layer in which the coefficient of thermal efficient is varied at a gradient continuously from the base material side to the coated layer side. The thickness of the intermediate layer, which may also differ depending on the structure as described above, may be preferably made about 0.01 to 1 mm, because both of relaxation of thermal stress and strengthening of adhesiveness can be satisfied.

When forming the mold material for molding of an optical part of the present invention, it may be conceivable to employ the process in which a commercially available base material is used, a coated layer is formed by flame spray coating on at least the molding surface of the base material and then finishing polishing is applied to a desired shape. However, for obtaining adhesiveness between the base material and the coated layer and a coated layer which is dense and of fine uniform grains, the process as described above is preferred.

As the base material to be used in the process for producing the mold material for molding of an optical part of the present invention, there can be included commercially available material subjected to working molding, or pressed powder formed according to the powder metallurgy method of the prior art as the base material of the starting material, which is formed into a composite product by pressurization and heating simultaneously with formation of the base material comprising the pressed powder into a sintered body.

The coating substance in the production process of the present invention is to form a coated layer during formation of a composite product by pressurization and heating. Examples of such coating substance may include, for example, respective powders of $Cr_2O_3$, $CrO_3$, $Cr(O,C)$, $Cr(O,N)$ and $Cr(O,C,N)$, or mixed powder of at least one selected from metallic chromium, chromium carbide, chromium nitride, carbon with chromium oxide, or precursors which become the coated layer by pressurization and heating such as chromic anhydride and chromium alkoxide. When the method in which the coating substance is coated in a slurry on the starting base material is used, or when the starting base material comprises pressed powder, the coating substance can be attached according to the method in which the coating substance is adjoined thereto also as pressed powder by, for example, pressurization. However, since there is difference in shrinkage factor during pressurization and heating between the base material and the coating substance and difference in optimum sintering conditions, particularly the starting base material is preferably used not as pressed powder but as a mass of a sintered body or an alloy. Next, the mold of the present invention can be prepared by embedding the base material comprising the coating substance attached thereon in boron nitride powder such as amorphous boron nitride powder or hexagonal boron nitride powder, and hot pressing the embedded material in vacuum, nitrogen gas or an inert gas under the conditions of a pressure of 50 kg/cm² or higher, preferably 200 to 500 kg/cm², a temperature of 1100° C. or higher, preferably 1250° C. to 1400° C. to form a composite comprising a coated layer and the base material, or further subjecting the composite product to the (HIP treatment) under the conditions of a pressure of 100 kg/cm² or higher and a temperature of 1100° C. or higher.

In the production process of the present invention, when an intermediate layer is formed, for example, formation of the intermediate layer comprising a compound such as TiC and TiN can be performed by the chemical vapor deposition method (CVD) or the physical vapor deposition method (PVD) of the prior art. However, particularly formation of the intermediate layer comprising a cermet composed of at least one compound phase selected from carbides, nitrides, carboxides and nitroxides of metals of the groups 4a, 5a and 6a groups of the periodic table and mutual solid solutions of these, and at least one metallic phase selected from Fe, Ni, Co and Cr and mutual alloys of these can be performed similarly as the coated layer as described above.

The mold material for formation of an optical part of the present invention has the actions of the the sintered body of a chromium compound or the coated film composed mainly of a chromium compound, namely inhibiting wetting of the mold for molding with the material for an optical part such as a molten glass preventing also coloration onto the material for optical part, inhibiting also foaming into the material for an optical part, and also inhibiting the reaction between the mold for molding and the material for an optical part, and further preventing coarsening the mold for mold and the surface of the part of the material to be molded through the synergistic effect with the lubricating action of the chromium compound itself.

The mold material for molding of an optical part of the present invention also comprises the first substance constituting the mold which promotes grain growth-inhibiting action of the chromium compound and sintering promoting action during sintering. As the result, the mold obtained has a fine grain structure which has been densified, becoming higher in strength and hardness as its material characteristics, and yet it has been rendered possible to effect finishing to the surface precision which has been difficult in the ceramics sintered body of the prior art.

Also, the second substance constituting the mold material for molding of an optical part of the present invention has the action of inhibiting precipitation of metallic chromium phase by forming a solid solution into the chromium compound during sintering, and further has the action of inhibiting the reaction of the chromium compound constituting the mold primarily with the softened material to be worked.

The mold material for molding of an optical part of the present invention has further the action of inhibiting the reaction, wetting and welding of the coated layer with a material to be worked, particularly a glass, whereby discoloration and surface coarsening of the material to be worked can be prevented, and the base material holds the coated layer to have also the action of covering the strength of the coated layer.

Also, the process for producing the mold material for molding of an optical part of the present invention, by performing hot press as embedded together with boron nitride powder, enables formation of a coated layer with a thickness which has been difficult by the chemical vapor deposition method or the physical vapor deposition method of the prior art, and yet enables formation of a dense coated layer.

The present invention is explained in more detail by referring to the following Examples.

EXAMPLE 1

By use of $Cr_2O_3$ powder with an average particle size of 0.1 μm and $ZrO_2$ powder with an average particle size of 0.03 μm, they were formulated into 91.3 vol % $Cr_2O_3$ - 8.7 vol % $ZrO_2$ (90 wt % $Cr_2O_3$ - 10 wt % $ZrO_2$), and the formulated powder, balls made of $ZrO_2$ ceramics and an organic solvent were placed into a vessel made of stainless steel lined with a polyurethane and mixed for 48 hours, followed by drying, to obtain mixed powder. The mixed powder was press molded into a sintered body of about 13×13×5 mm, then sintered into vacuum furnace with carbon heater by maintaining in vacuum of $1 \times 10^{-2}$ mm Hg and at 1550° C. for one hour, and subsequently subjected to HIP treatment under the conditions maintained in argon atmosphere at a pressure of 1500 atm and a temperature of 1350° C. for one hour to obtain a present product 1.

For comparison, various commercially available materials having a shape of about 13×13×5 mm were prepared.

The sintered body characteristics of the present product 1 and commercially available various comparative products were examined and the results are shown in Table 1. After the present product 1 and comparative products in Table 1 were each mirror polished each of commercially available lead (Schwer-Filent) glass, boric acid (Boi-Kron) glass A and boric acid (Schwer-Kron) glass B molded into about 4×4×4 mm was placed on the mirror polished surface of the present product 1 and various comparative products, and this was placed in a BN crucible in a vacuum furnace. Subsequently, after the vacuum furnace was evacuated to $1 \times 10^{-2}$ mm Hg, argon gas was permitted to flow thereinto, followed by the treatment under the conditions maintained at 700° C. for 1 hour in the case of the lead (Schwer-Filent) glass, and under the conditions maintained at 800° C. for one hour in the case of the boric acid (Boi-Kron) glass A and the boric acid (Schwer-Kron) glass B. For the various sintered bodys obtained, the amount of foam in the glass on the mirror polished surface, the wet angle between the sintered body and the glass, the state of corrosion of the mirror polished surface of the sintered body were examined, and further for the boric acid (Schwer-Kron) glass B, colored state of the glass was examined. These results are shown in Table 2.

TABLE 1

| | | Sintered body characteristics | | | |
|---|---|---|---|---|---|
| Sample No. | Composition | Average particle size (μm) | Hardness (Hv) | Transverase rupture strength (kg/cm²) | Specific gravity |
| Present product 1 | 91.3 vol % $Cr_2O_3$ - 8.7 vol % $ZrO_2$ | 5 | 1450 | 40 | 5.3 |
| Comparative product | | | | | |
| 1 | WC - Co type hard alloy | 0.5 | 1700 | 350 | 14.0 |
| 2 | $A/_2O_3$ - MgO type ceramic | 3 | 2000 | 50 | 4.0 |
| 3 | $ZrO_2$ - $Y_2O_3$ type ceramic | 1 | 1350 | 150 | 6.0 |
| 4 | $A/_2O_3$ - $ZrO_2$ type ceramic | 1 | 1500 | 200 | 5.2 |
| 5 | $A/_2O_3$ - TiC type ceramic | 2 | 2100 | 80 | 4.3 |
| 6 | SiC type ceramic | 5 | 2350 | — | 3.1 |
| 7 | $Si_3N_4$ type ceramic | 3 | 1650 | 100 | 3.3 |
| 8 | TiC type sintered body | 5 | 2250 | 75 | 5.1 |
| 9 | Ti (NO) type sintered body | 3 | 1350 | 45 | 5.4 |
| 10 | $TiB_2$ type sintered body | 3 | 2700 | — | 4.5 |

TABLE 2

| | Lead glass (Schwer-Flint) | | | Boric acid (Bor-Kron) glass A | | | Boric acid (Schwer-Kron) glass B | | | |
|---|---|---|---|---|---|---|---|---|---|---|
| Sample No. | Wet | Foaming | Corrosion | Wet | Foaming | Corrosion | Wet | Foaming | Corrosion | Coloration |
| Present product 1 | ⊙ | ⊙ | Δ | ⊙ | Δ | ○ | ⊙ | ⊙ | ⊙ | ○ |
| Comparative product | | | | | | | | | | |
| 1 | Δ | X | X | X | ○ | ○ | X | ⊙ | ○ | X |
| 2 | Δ | ○ | Δ | ○ | ○ | X | X | ⊙ | Δ | ○ |
| 3 | X | ○ | Δ | ⊙ | ○ | Δ | Δ | ⊙ | X | ○ |
| 4 | X | ○ | ○ | ⊙ | ○ | X | X | ⊙ | X | ○ |
| 5 | ⊙ | X | X | Δ | X | X | X | X | X | X |
| 6 | X | Δ | X | ○ | X | X | X | Δ | X | Δ |
| 7 | X | X | X | ○ | ○ | X | X | X | X | Δ |
| 8 | ⊙ | X | X | X | Δ | Δ | X | X | Δ | X |
| 9 | ⊙ | X | X | X | Δ | X | X | X | X | X |
| 10 | Δ | ○ | X | — | — | — | — | — | — | — |

*Evaluation standards

| Item | ⊙ | ○ | Δ | X |
|---|---|---|---|---|
| Wettability | great ← | | | → small |
| Foaming | small ← | Amount of foam | | → large |
| Corrosion | small ← | Corroded amount | | → large |
| Coloration | none ← | Coloration | | → do |

EXAMPLE 2

By use of the $Cr_2O_3$ powder used in Example 1, it was hot pressed by maintaining in nitrogen atmosphere under a pressure of 100 kg/cm$^2$ and a temperature of 1500° C. for one hour to obtain a present product 2. By adding 7.1 vol % of MgO powder into 92.9 vol % of the $Cr_2O_3$ powder used in Example 1 and forming into mixed powder in the same manner as in Example 1, followed by hot pressing similarly as in the above present product 2, a present product 3 was obtained. By adding 8.4 vol % of $ZrO_2$ powder and 12.9 vol % of $Al_2O_3$ powder into 78.7 vol % of the $Cr_2O_3$ powder used in Example 1 and mixing and molding in the same manner as in Example 1, followed by sintering by maintaining in vacuum of $1 \times 10^{-2}$ mmHg, at 1600° C. for one hour, a present product 4 was obtained. By mixing 1.3 vol % of Pt powder with 98.7 vol % of the $Cr_2O_3$ powder used in Example 1, and the mixed powder was hot pressed in the same manner as in the present produce 2 except for the temperature of 1500° C. to obtain a present product 5. By mixing and molding the mixed powder obtained by adding 7.4 vol % of Cr powder into 92.6 vol % of the $Cr_2O_3$ powder used in Example 1 in the same manner as in Example 1, followed by sintering by maintaining in vacuum at 1500° C. for one hour, a present product 6 was obtained. By mixing and molding the mixed powder obtained by adding 52 vol % of Cr powder into 48 vol % of the $Cr_2O_3$ powder used in Example 1 in the same manner as in Example 1, and then hot pressing by maintaining in nitrogen atmosphere at a pressure of 100 kg/cm$^2$ at a temperature of 1450° C. for one hour, followed by the treatment in a furnace of an oxygen partial pressure of 1 mm Hg at 900° C. for one hour, a present product 7 was obtained, having an inclined structure with the inner 5 μm layer from the surface of the product being the film of $Cr_2O_3$ and further the inner portion being reduced in $Cr_2O_3$ toward innerside to 500 μm. By plasma flame spray coating onto the surface of a dice steel of SKD61, a film of about 500 μm comprising 83.6 vol % $Cr_2O_3$-6.6 vol % $SiO_2$-4.1 vol % $ZrO_2$ components was formed to obtain a present product 8. Similarly as in Example 1, a sintered body comprising 29 vol % $Cr_2O_3$-38 vol % $Al_2O_3$-33 vol % $ZrO_2$ was prepared, and the surface of the sintered body was coated with chromic acid ($H_2CrO_4$) and dried, followed by the heat treatment maintained in the air at 500° C. for one hour, which was repeated four several times, to prepare a $Cr_2O_3$ coating with a thickness of about 300 μm to obtain a present product 9. On the surface of a commercially available $Al_2O_3$-TiC based sintered body was formed a $Cr_2O_3$ film with a thickness of about 5 μm according to the CVD method maintained in 4 vol % $CrO_2Cl_2$-6 vol % $CO_2$-90 vol % $H_2$ gas at 1100° C. for one hour, to obtain a present product 10. According to the PVD method in which a $Cr_2O_3$ target is sputtered onto the surface of a commercially available WC-Co type hard alloy in Ar gas stream, a $Cr_2O_3$ film of about 2 μm formed to give a present product 11.

These present products 2 to 11 were each mirror polished, and the test was conducted under the same conditions as in Example 1 by placing the lead (Schwer-Filent) glass used in Example 1 on the mirror polished surface, and the respective reaction states of the present products 2 to 11 relative to the lead (Schwer-Filent) glass were examined similarly as in Example 1. The results are shown in Table 3.

TABLE 3

| Sample No. | Lead (Schwer-Flint) glass | | |
|---|---|---|---|
| | Wettability | Foaming | Corrosion |
| Present product | | | |
| 2 | ⊚ | ⊚ | ⊚ |
| 3 | ⊚ | ⊚ | ○ |
| 4 | ⊚ | ○ | Δ |
| 5 | ⊚ | ⊚ | ⊚ |
| 6 | ⊚ | ⊚ | ⊚ |
| 7 | ⊚ | ⊚ | ⊚ |
| 8 | ⊚ | Δ | Δ |
| 9 | ⊚ | ○ | ⊚ |
| 10 | ⊚ | ⊚ | ⊚ |
| 11 | ⊚ | ○ | ○ |

EXAMPLE 3

By use of various commercially available powders with an average particle size of 1.5 μm or less, they were formulated into the compositions shown in Table 4. The formulated powder, balls made of $ZrO_2$ ceramics and methanol were placed into a stainless steel vessel lined with a polyurethane, mixed for 48 hours and dried to obtain a mixed powder. Each of the respective samples shown in Table 4 was subjected to hot press sintering under the sintering conditions comprising a pressure of 200 kg/cm$^2$, and a temperature and a maintenance time shown in Table 4, followed by application of the HIP treatment under the HIP treatment conditions shown in Table 4, to give present products 12 to 19.

The present products 12 to 19 and the Comparative products 11 to 15 thus obtained were observed by a metal microscope and a scanning type electron microscope. The respective particle sizes are shown in Table 5. Further, hardness and flexural strength of each sample were measured and shown together in Table 5.

Next, each sample was mirror polished by means of a lapping device in the order of rough polishing with $B_4C$, finishing polishing, lapping with 5 μm diamond, finishing lapping with 1 μm diamond, and each surface roughness was measured by a roughness meter. The results are also shown in Table 6. A commercially available lead (Schwer-Filent) glass was placed on the mirror worked surface, which was in turn placed in an atmosphere furnace, and the reactivity test with the glass was conducted under the conditions maintained at 700° C. for one hour while permitting argon gas containing 0.1 vol % of $O_2$ into the furnace. For these samples, the amount of foam in the lead (Schwer-Filent) glass, wet angle between the sintered body and the glass, peeling difficulty or easiness between the glass and the sintered body, corrosion state at the mirror surface portion of the sintered body were examined. The results are also shown in Table 6.

TABLE 4

| Sample No. | Formulated components (vol %) | | Sintering conditions | | HIP treatment conditions | |
|---|---|---|---|---|---|---|
| | Starting substance containing chromium | First starting substance | Atmosphere | Temperature (°C.) maintenance time | Pressure (atm) | Temperature (°C.) maintenance time |
| Present product | | | | | | |

TABLE 4-continued

| | Formulated components (vol %) | | Sintering conditions | | HIP treatment conditions | |
|---|---|---|---|---|---|---|
| Sample No. | Starting substance containing chromium | First starting substance | Atmosphere | Temperature (°C.) maintenance time | Pressure (atm) | Temperature (°C.) maintenance time |
| 12 | 90 $Cr_2O_3$ | 10 $ZrO_2$ | vacuum | 1300° C. - 30 min. | 1500 | 1250° C. - 60 min. |
| 13 | 70 $Cr_2O_3$ | 30 $ZrO_2$ | vacuum | 1300° C. - 30 min. | 1500 | 1250° C. - 60 min. |
| 14 | 85 $Cr_2O_3$ | 15 $HfO_2$ | vacuum | 1300° C. - 30 min. | 1500 | 1250° C. - 60 min. |
| 15 | 85 $Cr_2O_3$ | 15 $SiO_2$ | vacuum | 1350° C. - 30 min. | 1500 | 1250° C. - 60 min. |
| 16 | 85 $Cr_2O_3$ | 15 $Y_2O_2$ | vacuum | 1350° C. - 30 min. | 1500 | 1250° C. - 60 min. |
| 17 | 85 $Cr_2O_3$ | 15 $Yb_2O_3$ | vacuum | 1350° C. - 30 min. | 1500 | 1250° C. - 60 min. |
| 18 | 70 $Cr_2O_3$ 10 $Cr_3O_2$ | 20 $ZrO_2$ | $N_2$ | 1250° C. - 30 min. | 1500 | 1200° C. - 60 min. |
| 19 | 80 Cr(C,N,O)* | 20 $ZrO_2$ | $N_2$ | 1250° C. - 30 min. | 1500 | 1200° C. - 60 min. |

*Solid solution of Cr = 52.5 wt %, C = 1.3 wt %, O = 24.5 wt %, N = 0.2 wt %

TABLE 5

| | Sintered body | | | | |
|---|---|---|---|---|---|
| Sample No. | Chromium compound Average particle size (μm) | Average particle size of first substance and solid solution of first substance and chromium compound (μm) | Metallic chromium content (vol %) | Hardness (Hv) | Transverse rupture strength (kg/cm²) |
| Present product | | | | | |
| 12 | 2 | 0.5 | 0.02 | 1600 | 70 |
| 13 | 1.5 | 0.5 | 0.02 | 1350 | 90 |
| 14 | 2.5 | 1.5 | 0.02 | 1550 | 60 |
| 15 | 2 | 0.5 | 0.02 | 1450 | 55 |
| 16 | 2 | 1.0 | 0.02 | 1550 | 65 |
| 17 | 2.5 | 1.5 | 0.02 | 1500 | 60 |
| 18 | 2 | 0.5 | 0.05 | 1450 | 75 |
| 19 | 2.5 | 0.5 | 0.05 | 1450 | 75 |

TABLE 6

| Sample No. | Surface roughness of sample Rmax (μm) | Reactivity test with glass | | | |
|---|---|---|---|---|---|
| | | Forming | Wettability | Weldability | Corrosion |
| Present product | | | | | |
| 12 | 0.01 | ⊚ | ⊚ | ⊚ | ⊚ |
| 13 | 0.01 | ⊚ | ⊚ | ⊚ | ⊚ |
| 14 | 0.01 | ⊚ | ⊚ | ⊚ | ⊚ |
| 15 | 0.01 | ⊚ | ⊚ | ⊚ | ⊚ |
| 16 | 0.02 | ⊚ | ⊚ | ⊚ | ⊚ |
| 17 | 0.01 | ⊚ | ⊚ | ⊚ | ⊚ |
| 18 | 0.02 | ⊚ | ⊚ | ⊚ | ⊚ |
| 19 | 0.02 | ⊚ | ⊚ | ⊚ | ⊚ |

Evaluation standards in Table 6

| Test item | ⊚ | ○ | △ | X |
|---|---|---|---|---|
| Foaming | small | ← | Foamed amount | → | large |
| Wettability | great | ← | Wet angle | → | small |
| Weldability | easy | ← | Peelability | → | difficult |
| Corrosion | small | ← | Corroded amount | → | large |

EXAMPLE 4

By use of various commercially available powders with an average particle size of 1.5 μm or less, they were formulated into the composition shown in Table 7. By use of the formulated powders, Example 3 was repeated except that the atmosphere, the temperature and the maintenance time during sintering, and the pressure, the temperature and the maintenance time in the HIP treatment were changed to the conditions shown in Table 7, to obtain present products 20 to 24.

The present products 20 to 24 were examined similarly as in Example 3. The results are shown in Table 8. Next, the present products 20 to 24 and commercially available $Al_2O_3$ type ceramics, $ZrO_2$ type ceramics, $Si_3N_4$, SiC type ceramics used in Example 1 type ceramics were respectively added as Comparative products 2, 3, 7 and 8, and each was mirror worked similarly as in Example 3 and the surface roughness of each sample was measured. The results are shown in Table 9. The reactivity tests with glass conducted in Example 3 were similarly conducted. The results are also shown in Table 9.

TABLE 7

| | Formulated components (vol %) | | | Sintering conditions | | HIP treatment conditions | |
|---|---|---|---|---|---|---|---|
| Sample No. | Starting substance containing chromium | First starting substance | Second starting substance | Atmosphere | Temperature (°C.) Maintenance time | Pressure (atm) | Temperature (°C.) Maintenance time |
| Present product | | | | | | | |
| 20 | 85 $Cr_2O_3$ | 10 $ZrO_2$ | 5$Al_2O_3$ | Vacuum | 1300° C. - 30 min. | 1500 | 1250° C. - 60 min. |
| 21 | 60 $Cr_2O_3$ | 10 $ZrO_2$ | 30$Al_2O_3$ | Vacuum | 1300° C. - 30 min. | 1500 | 1250° C. - 60 min. |
| 22 | 85 $Cr_2O_3$ | 10 $ZrO_2$ | 5$TiO_2$ | Vacuum | 1300° C. - 30 min. | 1500 | 1250° C. - 60 min. |
| 23 | 80 $Cr_2O_3$ | 10 $HfO_2$ | 10$Nb_2O_5$ | Vacuum | 1300° C. - 30 min. | 1500 | 1250° C. - 60 min. |
| 24 | 80 $Cr_2O_3$ | 10 $SiO_2$ | 10$Ta_2O_5$ | Vacuum | 1300° C. - 30 min. | 1500 | 1250° C. - 60 min. |

TABLE 8

| Sample No. | Sintered body | | | | |
|---|---|---|---|---|---|
| | Chromium compound Average particle size (μm) | Average particle size of other compounds (μm) | Metallic chromium content (vol %) | Hardness (hv) | Transverse rupture strength (kg/cm²) |
| Present product | | | | | |
| 20 | 2 | 0.5 | less than 0.01 | 1650 | 70 |
| 21 | 2 | 0.5 | less than 0.01 | 1700 | 65 |
| 22 | 2 | 0.5 | less than 0.01 | 1500 | 55 |
| 23 | 2.5 | 1.5 | less than 0.01 | 1450 | 50 |
| 24 | 2 | 0.5 | less than 0.01 | 1450 | 45 |

TABLE 9

| Sample No. | Surface roughness of sample Rmax (μm) | Reactivity test with glass | | | |
|---|---|---|---|---|---|
| | | Foaming | Wett- ability | Weld- ability | Cor- rosion |
| Present product | | | | | |
| 20 | 0.01 or less | ⊚ | ⊚ | ⊚ | ⊚ |
| 21 | 0.01 or less | ⊚ | ⊚ | ⊚ | ⊚ |
| 22 | 0.01 or less | ⊚ | ⊚ | ⊚ | ⊚ |
| 23 | 0.01 or less | ⊚ | ⊚ | ⊚ | ⊚ |
| 24 | 0.01 or less | ⊚ | ⊚ | ⊚ | ⊚ |
| Comparative product | | | | | |
| 2 | 0.04 | ⊚ | X | X | Δ |
| 3 | 0.02 | ⊚ | X | ○ | Δ |
| 7 | 0.03 | X | X | ○ | X |
| 8 | 0.05 | X | X | Δ | X |

EXAMPLE 5

Of the samples in Example 3 and Example 4, present products 12, 13, 20 and 22 and Comparative products 2, 3 and 7 were used to prepare molding molds, and practical application tests corresponding to convex lens molding method of lead (Schwer-Filent) glass were conducted under the following molding conditions. The results are shown in Table 10.

Practical application test conditions:
Mold shape: 10φ × 12 mm
Molding temperature: 500° C.
Material to be worked: lead (Schwer-Filent glass 8F8) glass
Pressure applied: 100 kg
Pressurization time: 20 sec
Atmosphere: $N_2$-1.0 vol % $O_2$, or $N_2$-5.0 vol % $H_2$ Evaluation: molding time until glass is attached onto the molding surface or glass plane precision

TABLE 10

| Sample No. | Atmosphere during test | Molding times | Glass lens surface precision |
|---|---|---|---|
| Present product 12 | $N_2$-1.0 vol % $O_2$ | Still usable at 1000 times | $R_{max} = 0.03$ |
| Present product 13 | $N_2$-1.0 vol % $O_2$ | Still usable at 1000 times | $R_{max} = 0.02$ |
| Present product 20 | $N_2$-1.0 vol % $O_2$ | Still usable at 1000 times | $R_{max} = 0.01$ |
| Present product 22 | $N_2$-1.0 vol % $O_2$ | Still usable at 1000 times | $R_{max} = 0.01$ |
| Comparative product 2 | $N_2$-1.0 vol % $O_2$ | Attached at one time | $R_{max} = 0.10$ |
| Comparative product 3 | $N_2$-1.0 vol % $O_2$ | Mold surface coarsened at 5 times | $R_{max} = 0.04$ |
| Comparative product 7 | $N_2$-5.0 vol % $H_2$ | Mold surface attached at one time. | $R_{max} = 0.05$ |

EXAMPLE 6

By using commercially available $Al_2O_3$ type ceramics sintered body, TiC cermet sintered body, hard alloy corresponding to the JIS standard P10, heat-resistant steel, Inconel 100 super-alloy and 50 wt % $Al_2O_3$-50 wt % $Cr_2O_3$ sintered body, 90 wt % $Cr_2O_3$-10 wt % $ZrO_2$ sintered body, 85 wt % $Al_2O_3$-15 wt % Cr cermet sintered body as the base material, on the surface of each base material was pressure adhered the powder or coated in a slurry with an average particle size of 1.5 μm or less shown in Table 11, and as embedded in BN powder, pressurized and heated under the conditions also shown in Table 11 to prepare a composite product. The base material was shaped in a column of 10φ × 13 mm, with one surface of 10φ being made a concave surface of 15$^R$, and on this surface was pressure contacted or coated the powder of the coating substance shown in Table 11.

The coated layer thicknesses and the average crystal grain sizes of the coated layers of the present products 25 to 37 in Table 11 thus obtained were examined by a scanning electron microscope. The results are shown in Table 12. Next, to the present products 25 to 37 in Table 11 were added commercially available $Al_2O_3$ type ceramics sintered body, commercially available $ZrO_2$ type sintered body and commercially available SiC sintered body, respectively, as Comparative products 2, 3 and 7 and each mixture was formed into the same shape and the surface of the 15$^R$ was mirror polished into a composite mold, followed by the molding test of glass under the following conditions. The surface roughness of the mirror polished surface of each sample and glass molding test results in this case are also shown in Table 12.

TABLE 11

| Sample No. | Kind of base material | Coating substance (intermediate layer) component composition (wt %) | Coating method | Formation conditions of coating layer temperature, time, pressure |
|---|---|---|---|---|
| Present product | | | | |

TABLE 11-continued

| Sample No. | Kind of base material | Coating substance (intermediate layer) component composition (wt %) | Coating method | Formation conditions of coating layer temperature, time, pressure |
|---|---|---|---|---|
| 25 | $Al_2O_3$ type sintered body | 100 $Cr_2O_3$ | Press contact bonding | 1350° C. - 30 min., 200 kg/cm$^2$ |
| 26 | $Al_2O_3$ type sintered body | 90 $Cr_2O_3$ - 10 $ZrO_2$ | Press contact bonding | 1300° C. - 30 min., 200 kg/cm$^2$ |
| 27 | $Al_2O_3$ type sintered body | 85 $Cr_2O_3$ - 10 $ZrO_2$ - 5 $Al_2O_3$ | Press contact bonding | 1300° C. - 30 min., 200 kg/cm$^2$ |
| 28 | $Al_2O_3$ type sintered body | 85 $Cr_2O_3$ - 10 $Y_2O_3$ - 5 $TiO_2$ | Press contact bonding | 1300° C. - 30 min., 200 kg/cm$^2$ |
| 29 | $Al_2O_3$ type sintered body | 85 $Cr_2O_3$ - 10 $Cr_3C_2$ - 5 CrN | Press contact bonding | 1250° C. - 30 min., 200 kg/cm$^2$ |
| 30 | $Al_2O_3$ - $Cr_2O_3$ sintered body | 85 $Cr_2O_3$ - 10 $ZrO_2$ - 5 $Al_2O_3$ | Press contact bonding | 1300° C. - 30 min., 200 kg/cm$^2$ |
| 31 | $Cr_2O_3$ - $ZrO_2$ sintered body | 85 $Cr_2O_3$ - 10 $ZrO_2$ - 5 $Al_2O_3$ | Press contact bonding | 1300° C. - 30 min., 200 kg/cm$^2$ |
| 32 | $Al_2O_3$ - Cr cermet | 70 $Cr_2O_3$ - 30 $ZrO_2$ | Press contact bonding | 1300° C. - 30 min., 200 kg/cm$^2$ |
| 33 | TiC type cermet | 80 $Cr_2O_3$ - 10 $Cr_3C_2$ - 10 $ZrO_2$ | Press contact bonding | 1300° C. - 30 min., 200 kg/cm$^2$ |
| 34 | PIO corresponding hard alloy | 70 $Cr_2O_3$ - 30 $SiO_2$ | Press contact bonding | 1300° C. - 30 min., 200 kg/cm$^2$ |
| 35 | Heat-resistant steel | (90 $Cr_2O_3$ - 10 Ni intermediate layer) 90 $Cr_2O_3$ - 10 $Cr_3C_2$ | Slurry coating | 1250° C. - 30 min., 200 kg/cm$^2$ |
| 36 | Inconel 100 | (70 TiC - 30 Cr intermediate layer) 90 $Cr_2O_3$ - 10 $Al_2O_3$ | Slurry coating | 1250° C. - 30 min., 200 kg/cm$^2$ |
| 37 | $Al_2O_3$ type sintered product | Chromic anhydride ($CrO_3$) | * | 1200° C. - 30 min., 200 kg/cm$^2$ |

*After coating of aqueous solution, calcination at 500° C. was repeated for 5 times.

Glass molding test conditions:
Mold shape: $10\phi \times 13$ mm
Heating temperature: 500° C.
Applied pressure: 20 kg
Pressurization time: 20 sec
Atmosphere used: $N_2$ - (1 to 3%) $O_2$
Evaluation: after performing continuous molding for 250 times per one cycle, and judged by surface roughness and mold releasability of the material to be worked

UTILIZABILITY IN INDUSTRY

The mold material for molding of optical member of the present invention, as compared with various mold materials for molding of the prior art, is more excellent in lubricating effect to an optical member such as a glass, and inferior in affinity with various optical members, and therefore an optical member which is a material to be molded can be molded with ease during molding, whereby the precision of the plane molded of the

TABLE 12

| Sample No. | Coated layer Thickness (mm) | Coated layer Average particle size (μm) | Roughness of mirror surface of mold | Glass formation test numbers |
|---|---|---|---|---|
| Present product | | | | |
| 25 | 1 | 4 | 0.02 | Possible for 1000 or more times |
| 26 | 2 | 2.5 | 0.01 or less | Possible for 1000 or more times |
| 27 | 2.4 | 3 | 0.01 or less | Possible for 1000 or more times |
| 28 | 2.5 | 4 | 0.01 | Possible for 1000 or more times |
| 29 | 1.7 | 5 | 0.02 | Coated layer slightly peeled off at 500 times |
| 30 | 2.5 | 3 | 0.01 or less | Possible for 1000 or more times |
| 31 | 2.1 | 3 | 0.01 or less | Possible for 1000 or more times |
| 32 | 2.0 | 2 | 0.01 or less | Possible for 1000 or more times |
| 33 | 1.5 | 3.5 | 0.02 | Possible for 1000 or more times |
| 34 | 1.9 | 2 | 0.02 | Glass surface slightly coarsened at 300 times |
| 35 | 1.7** | 4 | 0.02 | Coated layer slightly peeled off at 300 times |
| 36 | 1.5*** | 3 | 0.02 | Coated layer slightly peeled off at 300 times |
| 37 | 0.7 | 1.5 | 0.01 or less | Possible for 1000 or more times |
| Comparative product | | | | |
| 2 | — | — | 0.05 | Attached at one time |
| 3 | — | — | 0.02 | Attached at 3 times |
| 7 | — | — | 0.02 | Attached at 5 times |

**Intermediate layer, having a thickness of 0.5 mm
***Intermediate layer, having a thickness of 1.0 mm optical member molded becomes also remarkably excellent, and also the damage at the molded surface of the mold for molding itself after molding is very little to improve remarkably its life, thus being useful in industry.

Also, the mold material for molding of an optical part of the present invention, as compared with commercially available oxide type ceramics or nonoxide type ceramics outside of the present products, is inferior in affinity with the optical member such as a glass, and excellent in lubricating effect to a glass, and therefore during molding, flowability of a glass which is the material to be worked becomes better to be molded with ease, the surface precision of the optical part molded such as a glass is markedly excellent, the glass part after molding is excellent in mold releasability from the mold material, whereby there is the effect that take-out can be easily done. Also, there is the effect that damage is very little at the molded surface of the mold material, whereby the state with excellent surface precision can be persistent for a long time to give a long life.

Further, the mold material for molding of an optical part of the present invention, as compared with the mold comprising a commercially available ceramics sintered body, has the effect of being excellent by 70- to 1000-times in lifetime in molding working of a glass and, for example, when applied to the case when polishing working after press formation can be done with difficulty such as nonspherical surface lens, there is the excellent effect of enabling bulk production.

Also, the mold material for molding of an optical part of the present invention has an excellent effect that it can be used in the air or an oxygen gas-containing atmosphere, and therefore, for example, the surface of the glass after molding working will become hazy with difficulty and can be practically applied as such state after press molding.

We claim:

1. A mold material for molding of an optical part, comprising a base material of a ceramics sintered body consisting essentially of aluminum oxide and a molding surface comprising a coated layer consisting essentially of a chromium compound selected from the group consisting of chromium oxide, chromium oxycarbide, chromium oxynitride and chromium oxycarbonitride, the molding surface being produced by a process comprising the steps of sintering a powdery mixture comprising at least 50% by volume of at least one chromium compound selected from chromium oxide, chromium oxycarbide, chromium oxynitride and chromium oxycarbonitride in a vacuum, in nitrogen gas or in an inert gas under the conditions of a pressure of 50 kg/cm$^2$ or higher and a temperature of 1100° C. or higher, and if necessary, subjecting to hot isostatic pressing under the conditions of a pressure of 1000 kg/cm$^2$ or higher and a temperature of 1100° C. or higher after sintering.

2. The mold material for molding of an optical part according to claim 1, wherein said molding surface comprises 50% by volume or more of the chromium compounds and, as the remainder, at least one additional compound selected from oxides, carbides, nitrides and borides of the metals of the groups 4a, 5a and 6a of the periodic table, oxides, nitrides and carbides of Si and B, oxides and nitrides of Al, oxides of alkaline earth metals, oxides of rare earth metals and mutual solid solutions of these.

3. The mold material for molding of an optical part according to claim 1, wherein said molding surface comprises at least 50% by volume of a chromium compound and, as the remainder, at least one additional compound or alloy of metals selected from the group consisting of Nb, Ta, Cr, W, Ru, Rh, Pd, Re, Ir, Pt, Au in an amount of 50 vol % or less.

4. The mold material for molding of an optical part according to claim 3, wherein said chromium compound further contains 0.1 vol % or less of metallic chromium.

5. A mold material for molding of an optical part according to claim 3, wherein said chromium compound is substituted with at least one compound selected from oxides, carbides, nitrides and borides of metals of the groups 4a, 5a and 6a of the periodic table, oxides, nitrides and carbides of Si and B, oxides and nitrides of Al, oxides of alkaline earth metals, oxides of rare earth metals and mutual solid solutions of these in an amount of 50 vol % or less.

6. The mold material for molding of an optical part according to claim 2, wherein said additional compound comprises 80 vol % or less of at least one second substance selected from the group consisting of oxides of Al, Ti, V, Nb and Ta and mutual solid solutions of these, with the balance comprising at least one first substance selected from oxides of Zr, Hf, Si and rare earth metals, and mutual solid solutions of these.

7. The mold material for molding of an optical part according to claim 2, wherein the surface roughness of said molding surface is 0.02 μm or less in terms of R$_{max}$.

8. A composite mold for molding of an optical part, said composite mold comprising:
   a base material that is a ceramics sintered body composed mainly of aluminum oxide, and a layer having a thickness of 0.1 to 5 mm on said base material, said layer consisting essentially of
   (1) 50% by volume or more of at least one chromium compound selected from the group consisting of chromium oxide, chromium oxycarbide, chromium oxynitride and chromium oxycarbonitride, and,
   (2) as the remainder, at least one compound selected from the group consisting of oxides, carbides, nitrides and borides of the metals of the groups 4a, 5a and 6a of the periodic table, oxides, nitrides and carbides of Si and B, oxides and nitrides of Al, oxides of alkaline earth metals, oxides of rare earth metals and mutual solid solutions of these.

9. The mold material for molding of an optical part according to claim 1, wherein said mold material comprises a body with a coated layer having a thickness of 0.1 to 5 mm, said coated layer comprising said sintered chromium compound.

10. The mold material for molding of an optical part according to claim 8, wherein said mold material comprises a body with a sintered coated layer consisting essentially of 50 vol % or less of at least one oxide phase selected from oxides of Ti, Zr, Hf, Al, Si and rare earth metals and mutual solid solutions of these with the balance consisting essentially of said chromium compound and inevitable impurities.

11. A mold material for molding of an optical part, which comprises a composite mold consisting essentially of an intermediate layer said intermediate layer being a single layer or a double layer consisting essentially of at least one compound phase selected from the group consisting of carbides, nitrides, oxycarbides and oxynitrides of metals of the groups 4a, 5a and 6a of the periodic table and mutual solid solutions of these, and at least one metal phase selected from the group consisting Fe, Ni, Co and Cr and mutual solid solutions of these, said intermediate layer being interposed between a base material selected from the group consisting of a hard alloy, a cermet, a refractory metal, a super alloy, a steel or a ceramics sintered body consisting essentially of aluminum oxide, and a coated layer, wherein at least the molding surface at which a material to be worked is molded comprises a coated layer having a thickness of 0.1 to 5 mm, said coated layer consisting essentially of (1) 50% by volume or more of a chromium compound selected from chromium oxide, chromium oxycarbide, chromium oxynitride and chromium oxycarbonitride, and (2) as the remainder, at least one compound selected from the group consisting of oxides, carbides, nitrides and borides of the metals of the groups 4a, 5a and 6a of the periodic table, oxides, nitrides and carbides of Si and B, oxides and nitrides of Al, oxides of alkaline earth metals, oxides of rare earth metals and mutual solid solutions of these with a thickness of 0.1 to 5 mm, and the coefficient of thermal expansion of said intermediate layer lying between the coefficient of thermal expansion of said base material and the coefficient of thermal expansion of said coated layer.

12. The mold material for molding of an optical part according to claim 11, wherein said coated layer is consisting essentially of 50 vol % or less of at least one oxide phase selected from the group consisting of oxides of Ti, Zr, Hf, Al, Si and rare earth metals and mutual solid solutions of these with the balance comprising said chromium compound and inevitable impurities.

13. A process for producing a coated layer on a base material to produce a mold material for molding of an optical part, said mold material comprising a base material selected from the group consisting of a hard alloy, a cermet, a refractory metal, a super alloy, a steel or a ceramics sintered body consisting essentially of aluminum oxide, and a molding surface comprising the coated layer, said process comprising the steps of sintering a powdery mixture comprising at least one first starting substance selected from the group consisting of oxides of Zr, Hf, Si and rare earth metals and mutual solid solutions of these, and at least 50 vol % of at least one chromium compound selected from the group consisting of oxides, carbides and nitrides of chromium and mutual solid solutions of these in vacuum, in nitrogen gas or in an inert gas under the conditions of a pressure of 50 kg/cm$^2$ or higher and a temperature of 1100° C. or higher, and, if necessary, further subjecting to hot isostatic press treatment under the conditions of a pressure of 1000 kg/m$^2$ or higher and a temperature of 1100° C. or higher after sintering, thereby obtaining a sintered body composed of at least one first substance selected from oxides of Zr, Hf, Si and rare earth metals and mutual solid solutions of these, with the balance composed of at least one chromium compound selected from oxides, oxycarbides, oxynitrides and oxycarbonitrides of Cr, said chromium compound containing not more than 0.1 vol % of metallic chromium mixed therein, and inevitable impurities.

14. A process for producing a mold material for molding of an optical part according to claim 13, wherein said powdery mixture additionally comprises at least one powdery second starting substance selected from the group consisting of oxides of Al, Ti, V, Nb and Ta and mutual solid solutions of these, the combined amount of said first and second starting substances being not more than 50 vol % of the powdery mixture, said second starting substance comprising not more than 80 vol % of the combined amount of said first substance and second starting substance.

15. A process for producing a composite mold consisting essentially of a coated layer formed on the surface of a base material selected from the group consisting of a hard alloy, a cermet, a refractory metal, a steel, a super-alloy, and a sintered body containing aluminum oxide or chromium oxide as a main component, which comprises applying a coating substance consisting essentially of (1) 50% by volume of at least one selected from the group consisting of chromium oxide powder, chromium oxycarbide powder, chromium oxynitride powder and chromium oxycarbonitride powder, and precursors which become chromium oxide, chromium oxycarbide, chromium oxynitride and chromium oxycarbonitride after temperature elevation and (2) as the remainder, at least one compound selected from the group consisting of oxides, carbides, nitrides and borides of the metals of the groups 4a, 5a and 6a of the periodic table, oxides, nitrides and carbides of Si and B, oxides and nitrides of Al, oxides of alkaline earth metals, oxides of rare earth metals and mutual solid solutions of these, on at least the molding surface of said base material at which a material to be worked is molded, or adjoining pressed powder comprising said coating substance adjacent thereto, then embedding the coated or adjoined product in boron nitride powder and forming it into a composite product in vacuum, nitrogen gas or an inert gas under the conditions of a pressure of 50 kg/cm$^2$ or higher and a temperature of 1100° C. or higher, and if necessary, further subjecting said composite product to hot isostatic pressing under the conditions of a pressure of 1000 kg/m$^2$ or higher and a temperature of 1100° C. or higher, thereby obtaining a composite mold with at least said molding surface consisting essentially of a coated layer with thickness of 0.1 to 5 mm.

16. A process for producing a coated layer on a base material to produce a mold material for molding of an optical part, said mold material comprising a base material selected from the group consisting of a hard alloy, a cermet, a refractory metal, a super alloy, a steel or a ceramics sintered body consisting essentially of aluminum oxide, and a molding surface comprising the coated layer consisting essentially of a chromium compound selected from the group consisting of chromium oxide, chromium oxycarbide, chromium oxynitride and chromium oxycarbonitride, said process comprising the steps of sintering a powdery mixture in vacuum, nitrogen gas or an inert gas under the conditions of a pressure of 50 kg/cm$^2$ or higher and a temperature of 1100° C. or higher, and if necessary, subjecting it to hot isostatic press treatment under the conditions of a pressure of 1000 kg/cm$^2$ or higher and a temperature of 1100° C. or higher after sintering, to obtain a mold material in which at least a molding surface of the mold material consists essentially of 50% by volume or more of at least one chromium compound selected from the group consisting of chromium oxide, chromium oxycarbide, chromium oxynitride and chromium oxycarbonitride, and, as the remainder, at least one compound selected from oxides, carbides, nitrides and borides of the metals of the groups 4a, 5a and 6a of the periodic table, oxides, nitrides and carbides of Si and B, oxides and nitrides of Al, oxides of alkaline earth metals, oxides of rare earth metals and mutual solid solutions of these.

17. The mold material for molding of an optical part according to claim 1, wherein the powdery mixture comprises at least 80% by volume of at least one chromium compound.

18. The process for molding of an optical part according to claim 1, wherein the powdery mixture to be sintered is embedded in BN during sintering.

19. The process for molding of an optical part according to claim 13, wherein the powdery mixture to be sintered is embedded in BN during sintering.

20. The mold material for molding of an optical part according to claim 12, comprising a double intermediate layer.

21. The mold material for molding of an optical part according to claim 13, wherein said intermediate layer is a double intermediate layer.

22. The mold material for molding of an optical part according to claim 11, wherein the base material is a ceramics sintered body consisting essentially of aluminum oxide.

23. The process according to claim 13, wherein the base material is a ceramics sintered body consisting essentially of aluminum oxide.

24. The process according to claim 16, wherein the base material is a ceramics sintered body consisting essentially of aluminum oxide.

* * * * *